Patented Aug. 30, 1938

2,128,291

UNITED STATES PATENT OFFICE 2,128,291

ART OF PAVING

Sam Everett Finley, Atlanta, Ga.

No Drawing. Application October 6, 1936,
Serial No. 104,227

5 Claims. (Cl. 94—23)

This invention relates to a method for combining natural mixtures of asphalt and aggregate sometimes used as a paving material, with an artificial mixture of asphalt and aggregate commonly used as a paving material, and in making the combination in such a way as to utilize, supplement, and increase the advantages of each type of material, to the end that in the combination I secure a paving product that is superior to either.

Natural mixtures of asphalt and aggregate are known as rock asphalts. They occur in deposits widely scattered throughout the United States. In some of these deposits where the quality and grading of the aggregate, plus the quality and amount of asphalt, are satisfactory, the rock asphalt has already been successfully used in thin layers as a pavement. However, if such rock asphalts are laid in strata over an inch thick, they frequently shove and rut under traffic, and are very slow in reaching stability. In other words, most of the rock asphalts have little or no structural strength and so cannot be used in layers much over an inch thick. The four variables mentioned above, viz: quality and screen size of aggregate, and quality and quantity of asphalt, must all lie within very definite limits if the rock asphalt is per se to be used as a pavement. Most of the deposits, however, carry insufficient asphalt, and some carry an excess asphalt, and therefore very few of these deposits have been developed and used in the building of pavements.

Artificial mixtures of asphalt and aggregates such as I use in this invention are known as plant-mixes. They are composed of asphalt-coated stone, or slag, or gravel, or sand, or other suitable aggregate, so graded as to size that the particles tend to interlock and key together into a mass having structural strength, and an inherent stability against internal movement of particle upon particle when subjected to traffic stresses. Gradings of aggregates for such mixes are commercially available in most localities, and they can be readily selected to meet my requirements.

It should be understood, however, that not all plant mixes are suitable for my use, but only those in which the aggregate furnishes some measure of structural strength and inherent stability. Mixtures in which the voids in the larger sizes are over-filled with smaller aggregate, and the voids in such smaller stones are overfilled with still smaller sizes and so on to dust, can have little such stability because all tendency to interlock may be prevented by small aggregate showing larger aggregate out of contact. Such mixtures having all voids overfilled are so dense that they exclude water when mixed with asphalt but they lack the structural strength and resistance to traffic stress that I require to serve my invention. It is also true that although the aggregates I use for my artificial mix have high structural strength, that the very fact requires that the mix be open in texture, that is, that it have unfilled voids. The total volume of voids varies, of course, with the gradation of the aggregates. For plant mixes composed of aggregates of the same size the percentage of voids may be as high as 40, while plant mixes made up of aggregates of various sizes may contain a comparatively small percent of voids.

The present invention provides for mixing proper parts of rock asphalt with proper plant-mixes in such a way as to retain all of the advantages of each, such as the non-skid, waterproof, and long life features of the rock asphalt, together with the cheapness, and the high structural strength of properly constituted plant-mixes. The combination may also be used in all regular thicknesses instead of being subject to the present thickness limitations of the rock asphalt.

In carrying out my invention I first consider the named variables of the available rock asphalt, so that I may bring up any deficiencies during manufacture. I next select a grading of aggregate to supplement the grading of the rock asphalt to the end that, when the two are mixed, the resultant grading will retain the structural strength of the plant-mix and will have the voidage filled or partially filled with the rock asphalt, which will provide a waterproof surface. The percentage of voids will, as stated, vary and consequently the ratio of rock asphalt to plant-mix will therefore vary through a wide range, but waterproofing the pavement rather than merely filling or partly filling the voids being the real criterion, I use sufficient rock asphalt to accomplish that end.

I next place the dry aggregate of the plant-mix in proper quantity in a suitable mixing machine, and there coat the aggregate with a predetermined amount and quality of asphalt, thus producing the required plant-mix. I then add the proper amount of rock asphalt to the mix, and continue the mechanical mixing of the two materials until the mass is thoroughly admixed. Next I add sufficient asphalt so that the whole will properly bond when compacted into the pavement structure.

As a definite example of the working of my invention, suppose we consider a typical case common throughout the central states, as follows: Suppose the plans call for a two inch compacted layer of bituminous pavement to be manufactured and laid over an old pavement. Suppose that the available rock asphalt will all pass a ten mesh screen, and that it contains 4% of asphalt available for rebounding. If I were to use aggregates, which would pass a 1" ring and be retained on a ¼" or a ⅛" ring, 12% to 20% of the rock asphalt would be adequate to accomplish the purpose. However, the grading of coarse aggregate usually specified for use in a two inch pavement will all pass a 1½" ring and be retained on a ¾" ring. Such aggregate when compacted will have between 35% and 40% of voids, indicating that, say, 35% of rock asphalt plus 65% of coarse aggregate should be used, that is, one part of rock asphalt to two parts of coarse aggregate.

I therefore place 2 parts of the dry coarse aggregate in the rotary mixing machine, and there coat it with about 4% of asphalt, that is, with the normal amount of asphalt required to bond such aggregates. As soon as the coarse aggregate has thus been converted into plant mix, I add 1 part of the rock asphalt, and I continue mixing until the mass is homogeneous in appearance. I then add to the whole sufficient asphalt of the proper grade to serve the admixture so that the whole will bond satisfactorily when spread and compacted upon the street. The product is now ready to be placed on the street and there converted into pavement.

The aggregate in some plant-mixes might be graded so as to require as little as 10% to 20% of the rock asphalt.

If either of the above mixtures is made with heated aggregates and will set up or become hard from the loss of heat, it is called a hot-mix pavement. If it sets up from other causes than the loss of heat it is called a cold-lay pavement. If I desire to produce a cold-lay pavement, I carry on the stated operations exactly as above outlined, with the exception, that I would use cold mix or cold manufacture operations. I may use any of those open to public use, but preferably proceed in accordance with my U. S. Patents Nos. 1,845,405 and 1,991,319.

The working of the invention when only sand is available, or when sand aggregate is cheaper or for some other reason more suitable than crushed stone, slag, etc., is as follows: Suppose the plans call for a one inch thickness of compacted pavement and that a local sand, having sufficient stability, is economically available, and that the same type of rock asphalt as used in the first example is available. I would then test the voidage in the sand when shaken down, and then proceed exactly as in the first example, except that I would vary the amount of rock asphalt used to supplement the voidage shown by the sand.

In cases where the useful asphaltic content of the natural rock asphalt is less than enough to bond the material into a suitable pavement, this invention permits me to produce a uniformly coated mixture of both rock asphalt and plant-mix so that a balanced product results. For example, suppose the rock asphalt contains 4% of asphalt available for rebonding the mass, and that I add 4% of asphalt to the plant-mix, then mingle the coated rock asphalt with the coated plant mix. The mingled mass will of course contain 4% of asphalt carried equally by rock asphalt and by the plant-mix. If to this mass I now add sufficient asphalt to complete the required amount for proper bonding of the pavement, then the added amount will also be equally distributed over all particles, and the entire mass will be a homogeneous mass of uniformly coated aggregate. I call such an uniformly coated homogeneous mass a "balanced mix". Such a mix should not be confused with certain prior practice, according to which uncoated aggregates, such as sand, were added to heated rock asphalt and to the mixture of which was added a further quantity of asphalt. For example, in one illustrative case, to heated rock asphalt, containing about 4% of asphalt, was added 20% of uncoated sand and 4% more asphalt was then added. The resulting mix contained approximately 80% of particles coated with 8% of asphalt, plus the 20% of sand coated with 4% of asphalt. This was, manifestly, an unbalanced mix in which the aggregates were not uniformly coated. The finished mix had no greater structural strength than if the sand had not been added. The uncoated sand was in no sense a plant-mix such as contemplated by the present invention.

I have hereinbefore referred to the filling of the voids of the plant mix with rock asphalt, but I wish it understood that this invention is not limited to a degree of perfect exactness in this connection, but rather it is to be understood that the voids are filled or substantially filled to that extent necessary to produce a waterproof condition.

One of the problems confronting present-day road builders is to produce, as nearly as possible, a surface on which the tires of automobiles will not slip or skid. The best results in this direction are obtained when the road surface is of rasp-like character. If all of the voids at the surface of the road are completely filled, a rasp-like surface is practically impossible of accomplishment, and yet such a surface should be waterproof. The present invention successfully accomplishes these purposes by providing a sufficient amount of rock asphalt at or directly adjacent the surface to render the road waterproof without detracting from the rasp-like surface thereof. I have found that, in some cases, the addition of 10-20% of rock asphalt will adequately waterproof the road and yet permit of the sharp rasp-like surface to which I have referred.

It is well known that rock asphalt pavements are relatively costly, while asphaltic concrete is appreciably more economical. When practising my invention, it is entirely practical to employ approximately two parts of asphaltic concrete to one part of rock asphalt and I thus save very appreciably over the cost of a rock asphalt pavement, while obtaining all the advantages thereof together with all the structural advantages of asphaltic concrete. According to the present invention, I am able to greatly increase the use and value of undeveloped deposits of rock asphalt, secure the advantages of rock asphalt at a much reduced cost, add the structural strength where none existed and produce a lower cost pavement of higher value than possible under prior practice.

The foregoing detailed description sets forth the invention in its preferred practical procedure, but the invention is to be understood as fully commensurate with the appended claims.

The invention is directed primarily to the method of making paving materials, but also includes the mixed composition of matter and a finished road embodying such composition compacted upon an appropriate foundation which in practice may be an old road, as in the case of resurfacing, or any other appropriate foundation or leveled surface common to the art.

Having thus fully described the invention, what I claim as new and desire to secure as Letters Patent is:

1. The method of making a road paving composition which comprises mixing graded aggregates with a predetermined percentage of bitumen substantially corresponding to the percentage of bitumen naturally contained in the rock asphalt to be later added, then adding a quantity of such rock asphalt and thoroughly mixing the whole, and finally adding thereto further bitumen in sufficient quantity to produce an adequate cementitious bond in a pavement of such composition.

2. The method of making a road paving composition which comprises mixing graded aggregates with a predetermined percentage of bitumen, then adding to the mixture a quantity of rock asphalt containing substantially the same percentage of bitumen, thoroughly admixing the whole, and adding thereto further bitumen in sufficient quantity to produce an adequate cementitious bond in a pavement of such composition.

3. The method of making a road paving composition which comprises admixing together rock asphalt having a predetermined percentage of asphalt available for rebonding with asphaltic concrete having substantially the same percentage of available asphalt, and applying, to both the rock asphalt and asphaltic concrete simultaneously, further bitumen in sufficient quantity to produce an adequate cementitious bond in a pavement of such composition.

4. A paving composition comprising a mixture of natural rock asphalt and artificial asphaltic concrete, all mineral particles of the composition having a substantially uniform coating of bitumen and forming a balanced product wherein the aggregate of the artificial asphaltic concrete carries substantially the same proportion of bitumen as the natural rock asphalt.

5. A pavement comprising a compacted mixture of natural rock asphalt and artificial asphaltic concrete, bonded together by bitumen forming a substantially uniform coating over the individual aggregates of both indiscriminately, and forming a balanced product wherein the aggregate of the artificial asphaltic concrete carries substantially the same proportion of bitumen as the natural rock asphalt.

SAM EVERETT FINLEY.